US010105832B2

(12) United States Patent
Martinsson et al.

(10) Patent No.: US 10,105,832 B2
(45) Date of Patent: Oct. 23, 2018

(54) BATTERY POWERED TOOL

(75) Inventors: Pär Martinsson, Jönköping (SE);
Johan Björnlinger, Huskvarna (SE);
Oskar Bergquist, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 585 days.

(21) Appl. No.: 13/807,936

(22) PCT Filed: Jul. 2, 2010

(86) PCT No.: PCT/SE2010/050765
§ 371 (c)(1),
(2), (4) Date: Jan. 2, 2013

(87) PCT Pub. No.: WO2012/002860
PCT Pub. Date: Jan. 5, 2012

(65) Prior Publication Data
US 2013/0098647 A1    Apr. 25, 2013

(51) Int. Cl.
*B25F 5/02*    (2006.01)
*A01G 3/053*    (2006.01)
*B27B 17/00*    (2006.01)

(52) U.S. Cl.
CPC .............. *B25F 5/02* (2013.01); *A01G 3/053* (2013.01); *B27B 17/00* (2013.01)

(58) Field of Classification Search
USPC ......................................................... 173/29
See application file for complete search history.

(56) References Cited

U.S. PATENT DOCUMENTS

| 4,084,123 | A |   | 4/1978  | Lineback et al. |
| 4,383,782 | A | * | 5/1983  | Pillifant, Jr. ............ E01F 13/02 116/63 P |
| 4,555,849 | A | * | 12/1985 | Ando ...................... B27B 9/00 30/388 |
| 4,835,410 | A | * | 5/1989  | Bhagwat et al. .............. 307/64 |
| 4,847,513 | A | * | 7/1989  | Katz ..................... B23D 47/12 30/DIG. 1 |
| 4,912,349 | A | * | 3/1990  | Chang ..................... B25F 5/02 173/170 |
| 5,054,563 | A | * | 10/1991 | Zapf ....................... B25B 21/00 173/217 |

(Continued)

FOREIGN PATENT DOCUMENTS

| CN | 1281775 A | 1/2001 |
| CN | 1660533 A | 8/2005 |

(Continued)

OTHER PUBLICATIONS

Hitachi DH18DL 18 Volt Lithium-Ion SDS Rotary Hammer Kit, printed from http://www.toolbarn.com/hitachi-dh18dl.html.
(Continued)

*Primary Examiner* — Hemant M Desai
*Assistant Examiner* — Mobeen Ahmed
(74) *Attorney, Agent, or Firm* — McNair Law Firm, P.A.

(57) ABSTRACT

The present disclosure relates to a battery powered tool (1) extending in a longitudinal direction (Z), comprising a tool body (10) and a battery pack (20), which battery pack is arranged on the tool body and adapted to power the tool. The tool body is provided with a through aperture adapted to receive the battery pack, such that the tool body at least partly surrounds the battery pack.

20 Claims, 5 Drawing Sheets

(56) References Cited

U.S. PATENT DOCUMENTS

| | | | |
|---|---|---|---|
| 5,208,525 A * | 5/1993 | Lopic | A01G 3/053 310/50 |
| 5,553,675 A | 9/1996 | Pitzen et al. | |
| 5,578,392 A | 11/1996 | Kawamura | |
| 5,725,304 A * | 3/1998 | Inai | B25F 5/008 366/108 |
| 6,039,126 A * | 3/2000 | Hsieh | B25B 21/00 173/170 |
| 6,179,192 B1 * | 1/2001 | Weinger et al. | 227/8 |
| 6,257,351 B1 * | 7/2001 | Ark | A61B 17/1626 173/178 |
| D447,924 S * | 9/2001 | Neitzell | D8/61 |
| 6,304,058 B2 * | 10/2001 | Watson | B25F 5/02 320/114 |
| 6,357,534 B1 | 3/2002 | Buetow et al. | |
| 6,775,913 B2 | 8/2004 | Fey et al. | |
| 7,053,567 B2 | 5/2006 | Yamamoto | |
| 7,343,683 B2 | 3/2008 | Buck et al. | |
| 7,581,323 B2 | 9/2009 | Miklosz et al. | |
| 7,814,816 B2 * | 10/2010 | Alberti | H02J 7/0045 81/57.13 |
| 7,926,187 B2 | 4/2011 | Uehlein-Proctor et al. | |
| 8,128,250 B2 * | 3/2012 | Parrinello | B25F 5/021 362/109 |
| 8,733,470 B2 * | 5/2014 | Matthias et al. | 173/217 |
| 8,757,288 B2 * | 6/2014 | Heinzelmann | B25F 5/02 173/216 |
| 8,869,912 B2 | 10/2014 | Roßkamp et al. | |
| 9,770,821 B2 * | 9/2017 | Racov | A01D 34/902 |
| 2003/0095842 A1 * | 5/2003 | Bone | B25F 5/02 408/234 |
| 2003/0174449 A1 * | 9/2003 | Yamamoto | B25B 21/00 361/23 |
| 2004/0029426 A1 | 2/2004 | Lui et al. | |
| 2004/0098869 A1 * | 5/2004 | Ashfield | 30/383 |
| 2004/0158996 A1 * | 8/2004 | McIntosh | 30/380 |
| 2005/0221654 A1 | 10/2005 | Phillips et al. | |
| 2006/0107536 A1 * | 5/2006 | Buck | B25F 5/02 30/388 |
| 2006/0108981 A1 | 5/2006 | Watson | |
| 2007/0210733 A1 | 9/2007 | Du et al. | |
| 2007/0245575 A1 * | 10/2007 | Rosskamp | A01G 3/053 30/392 |
| 2008/0032190 A1 * | 2/2008 | Furuta | B25F 5/02 429/163 |
| 2008/0196256 A1 | 8/2008 | Gieske et al. | |
| 2008/0216458 A1 * | 9/2008 | Lucas et al. | 56/10.6 |
| 2008/0276407 A1 * | 11/2008 | Schnittman | A47L 11/34 15/319 |
| 2008/0284363 A1 * | 11/2008 | Lucas et al. | 318/441 |
| 2009/0143929 A1 | 6/2009 | Eberhard et al. | |
| 2009/0240245 A1 * | 9/2009 | Deville et al. | 606/33 |
| 2010/0218386 A1 * | 9/2010 | Ro kamp | A01G 3/053 30/277.4 |
| 2010/0218967 A1 * | 9/2010 | Ro kamp | A01G 3/053 173/217 |
| 2010/0248016 A1 | 9/2010 | Hanawa et al. | |
| 2011/0308831 A1 * | 12/2011 | Martinsson | B25F 5/02 173/217 |
| 2012/0073889 A1 * | 3/2012 | Franzen | B60L 11/18 180/68.5 |
| 2013/0056235 A1 * | 3/2013 | Pozgay | B25B 21/00 173/29 |

FOREIGN PATENT DOCUMENTS

| | | | | |
|---|---|---|---|---|
| CN | 1292511 C | | 12/2006 | |
| CN | 2882922 Y | | 3/2007 | |
| DE | 3502449 A1 | | 8/1985 | |
| DE | 3841735 A1 | | 6/1990 | |
| DE | 9209104 U1 | | 9/1992 | |
| DE | 102009035487 A1 | | 2/2011 | |
| EP | 1075906 A2 | | 2/2001 | |
| EP | 1205282 A2 | | 5/2002 | |
| EP | 2080594 A1 | | 7/2009 | |
| EP | 2223780 A2 | | 9/2010 | |
| JP | 1281880 A | | 11/1989 | |
| JP | 01281880 A | * | 11/1989 | B25F 5/00 |
| JP | H0586486 U | | 11/1993 | |
| JP | H06223804 A | | 1/1994 | |
| JP | 2003266334 A | | 9/2003 | |
| JP | 2010135273 A2 | | 6/2010 | |
| WO | 2007098785 A1 | | 9/2007 | |
| WO | 2008156602 A1 | | 12/2008 | |

OTHER PUBLICATIONS

International Search Report and Written Opinion of PCT/SE2010/050765 dated Mar. 17, 2011.
Chapter I International Preliminary Report on Patentability of PCT/SE2010/050765 dated Jan. 8, 2013.
International Search Report & Written Opinion in the International Application No. PCT/EP2010/001405 dated Dec. 6, 2010.
International Search Report & Written Opinion in the International Application No. PCT/EP2010/001406 dated Dec. 6, 2010.
International Search Report and Written Opinion in the International patent application No. PCT/SE2011/050308 dated Nov. 24, 2011.
International Preliminary Report on Patentability in the International patent application No. PCT/EP2010/001406 dated Apr. 5, 2012.
International Preliminary Report on Patentability in the International patent application No. PCT/EP2010/001405 dated Apr. 19, 2012.
International Preliminary Report on Patentability in the International patent application No. PCT/SE2011/050308 dated Sep. 24, 2013.

* cited by examiner

BATTERY POWERED TOOL

TECHNICAL FIELD

The present disclosure relates to a power tool and more particularly to a battery powered tool.

BACKGROUND

The battery pack constitutes a considerable part of the weight of a battery powered tool. In large tools it is important that the battery pack is placed in a good place on the tool to provide good ergonomics for a user. Further, a battery powered tool such as, but not limited to, a chain saw, a hedge trimmer or a vegetation trimmer, may be used in rough environments, providing extra demands for a robust design of the tool. In common designs of a handheld power tool, the battery pack is attached to the tool body by hanging fully exposed underneath the tool body. It is thereby exposed to impacts that may occur during use in a rough environment. Such impacts could cause damage to the battery pack or cause that the battery pack looses from its connection to the tool. Further, a solution to that problem could be to mount the battery inside the tool body. However, such solution provides an inaccessible battery pack that needs much effort from a user to be removed from the tool.

Further, for a handheld power tool such as a trimmer or a chain saw, it is important that the center of gravity of the tool is located such that good ergonomics for the user is provided. At some occasions it may be useful if the handheld power tool is able to receive battery packs of different sizes. In present solutions, a change to a larger battery pack may cause an overweight to either side of the power tool, such that an unbalance in the power tool occurs. Such unbalance affects the ergonomics of the power tool for the user negatively.

Consequently, there is a need for a tool with a battery pack that is easy accessible and still not exposed to impacts, and further a tool that provides good ergonomics for the user even for different battery pack sizes.

SUMMARY

In view of the above, it is an objective to solve or at least reduce the problems discussed above. In particular, an objective is to provide a battery powered tool that protects the battery pack and that provides good ergonomics for a user.

This is achieved by providing a battery powered tool extending in a longitudinal direction, comprising a tool body and a battery pack which battery pack is arranged on the tool body and adapted to power the tool. The battery powered tool is characterized in that the tool body is provided with a through aperture adapted to receive the battery pack, such that the tool body at least partly surrounds the battery pack.

A battery powered tool is thereby provided wherein the tool body may have a protective structure surrounding the battery pack. It may then be avoided that the battery pack is hit during use such that it would be damaged or would come loose from the connection with the tool body. The protective structure may be a stiff structure that surrounds the battery pack. A tool body that surrounds the battery pack may also be provided with a lifting means, such as a hook or similar, at the longitudinal end portion of the tool body, which means would not be possible to provide on a battery pack being mounted unprotected at the end portion of the tool body.

In one embodiment, the through aperture may elongate in a direction perpendicular to the longitudinal direction of the tool. A battery pack that is mounted in a through aperture elongating in the same longitudinal direction as the tool, may be exposed to a larger risk of impact with trees or other obstacles during use of the tool in a rough environment. With the through aperture in a direction perpendicular to the longitudinal extension direction of the tool, the ergonomics for the user may be preserved good even for different sizes of the battery pack.

In another embodiment, a length of the battery pack is substantially the same as a length of the through aperture. The battery pack may thereby be visible from the outside of the tool body, but surrounded by the tool body such to be protected from impacts. The battery pack may not protrude outside the tool body, and thereby not being exposed to impacts.

In a further embodiment, the at least one end of the battery pack may protrude outside the tool body when mounted in the through aperture. Thereby, the possibility of variable sizes of battery packs for the tool may be provided.

In a yet further embodiment, two ends of the battery pack may protrude outside the tool in two directions along the elongation direction of the through aperture when the battery is mounted in the through aperture.

In another embodiment, the battery pack may be adapted to protrude in substantially equal amounts in the two directions. By having the battery pack protrude in equal amounts in the two directions outside the tool body, the balance in the tool may be kept at a good level even for different sizes of battery pack. A larger battery pack may thereby not cause an overweight in any of the two directions, instead it is kept centrally located on the tool. Such overweight may otherwise cause an unwanted rotational movement around the longitudinal extension direction of the tool.

According to one embodiment, the tool body may be provided with a connector within the through aperture, which connector may be adapted to integrate with a corresponding connector on the battery pack when the battery pack is mounted in the through aperture. The connectors may be adapted to transfer power from the battery pack to the tool body. The tool body may comprise an electric motor adapted to be powered by the battery pack. Further, the connectors may provide a holding or locking function for the battery pack in the through aperture. The connectors may thereby be designed in order to lock the battery pack such that it may not fall out from the through aperture by itself. The battery pack may be unlocked by a user.

In a further embodiment, the battery pack may be visual from the outside when mounted in the through aperture. Thereby, the battery pack may be surrounded by the tool body, but not in a way that provides that the battery pack is not visual from the outside. Since the battery pack is mounted in a through aperture, it may be visual from two sides of the tool body. By being visual from the outside, the battery pack may be easy accessible even though it may be surrounded by the tool body. A removal of the battery pack may not need excessive effort from a user. The battery pack may further be provided with an indicator, which indicator may provide information about the power status of the battery pack. The indicator may be visual from the outside directly on the battery pack.

In a further embodiment, the battery powered tool may be provided with an indicator that may indicate whether or not the battery pack is correctly fitted in the through aperture. Such indicator may be visual from the outside such that an operator may see the indication whether the battery pack is correctly positioned in the through aperture. Thereby, it may be avoided that the battery pack is incorrectly fitted in the through aperture, which may damage the battery pack or the tool body. The indicator may in one embodiment be a color marking, indicating the correct or incorrect position of the battery pack.

In one embodiment, the battery pack may comprise a locking device adapted to lock the battery pack to the tool. Thereby, it may be avoided that the battery pack may unintentionally loose from the mounting position in the through aperture.

In another embodiment, the tool may be a handheld garden tool or a handheld forestry tool. Such handheld garden tool or forestry tool may be, but not limited to, a hedge trimmer, trimmer, chain saw, top handle chain saw or the like.

BRIEF DESCRIPTION OF THE DRAWINGS

The invention will in the following be described in more detail with reference to the enclosed drawings, wherein.

DETAILED DESCRIPTION OF EMBODIMENTS

Figure 1:
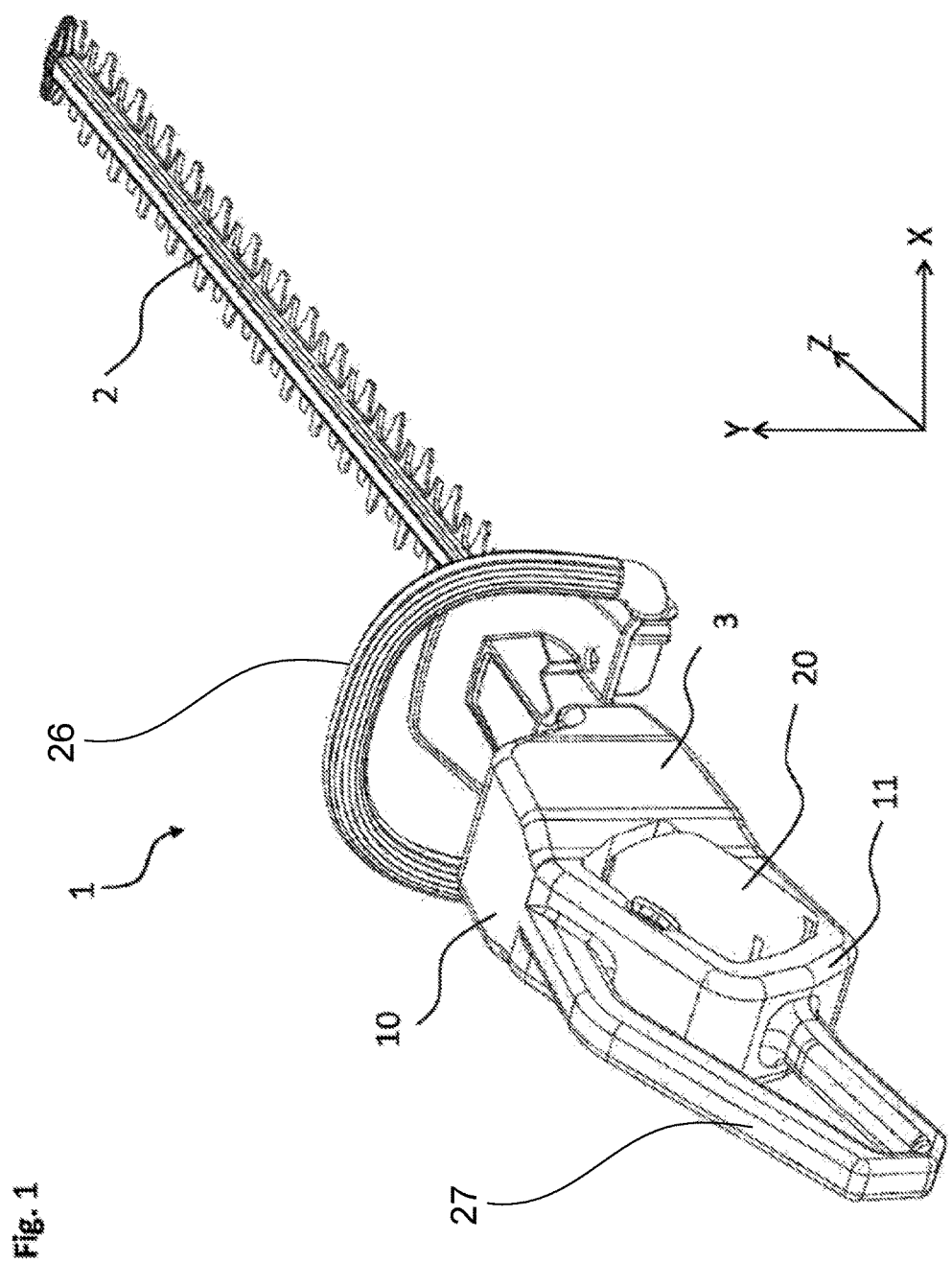
FIG. 1 shows a perspective view of a battery powered tool according to an embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 describes a battery powered tool 1, in this case a battery powered hedge trimmer, with a longitudinal extension along direction Z, wherein an operating part 2 is located in one end of the tool 1. The tool 1 further comprises a tool body 10. The tool 1 further comprises a first handle 27 affixed to the tool body 10 at an end of the tool 1 opposite of the end holding the operating part 2 (i.e., the rear end of the tool 1). The tool 1 further comprises a second handle 26 affixed to the tool body 10 and positioned forward of the first handle 27 along direction Z. In an end of the tool opposite of the end holding the operating part 2, the tool body 10 comprises a through aperture for receiving a battery pack 20. The through aperture is positioned forward of the first handle 27 along the direction Z. The second handle 26 is positioned forward of the through aperture and rearward of the operating part 2 along direction Z. The battery pack is adapted to power an electric motor 3 in the tool 1. The electric motor drives the operating part 2 during operation of the tool 1. The through aperture elongates through the tool body 10 in a direction X, Y that is perpendicular to the longitudinal extension direction Z of the tool 1. This elongation direction of the through aperture is preferably through the sides of the tool body 10 in the direction X. The through aperture may also be through the top and the bottom of the tool body along the direction Y. The battery pack 20 extends through the through aperture and is locked in the through aperture by a locking means 23. When the battery pack 20 is mounted in the through aperture, the battery pack 20 is surrounded by a surrounding part 11 of the tool body 10. The surrounding part 11 is stiff and protects the battery pack 20 when it is mounted in the through aperture. Since the surrounding part 11 surrounds the battery pack 20 in the outermost part of the tool body 10 along the longitudinal direction Z, the tool body 10 may in that outermost surrounding part 11 be provided with a hook or similar fastening means. Such hook may be used for fastening a rope that could be used as a safety feature. Such safety feature may be useful when using the tool in a tree.

Figure 2:
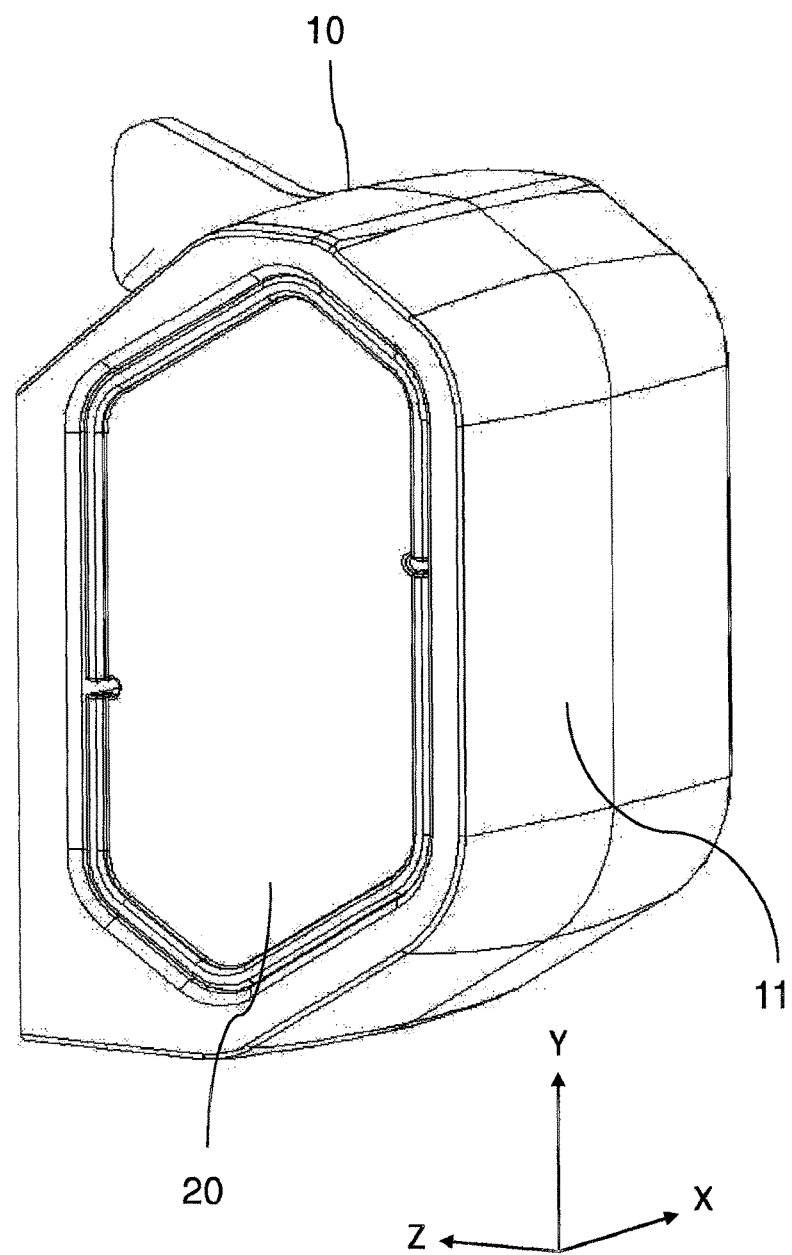
FIG. 2 shows a perspective view of a rear part of a battery powered tool with a mounted battery pack according to an embodiment of the invention.

FIG. 2 describes a battery pack 20 of normal size mounted in the through aperture 12 in the tool body 10. The battery pack 20 is visible from the outside, but no part of the battery pack 20 extends outside the tool body 10. The length of the battery pack 20 along the direction X is similar as the extension length of the through aperture 12 in the tool body 10 along the direction X. The battery pack 20 is thereby completely protected by the tool body 10 and the surrounding part 11, and no parts of the battery pack 20 protrudes outside the tool body 10. The battery pack 20 may also have a length that is shorter than the extension length of the through aperture.

Figure 3:
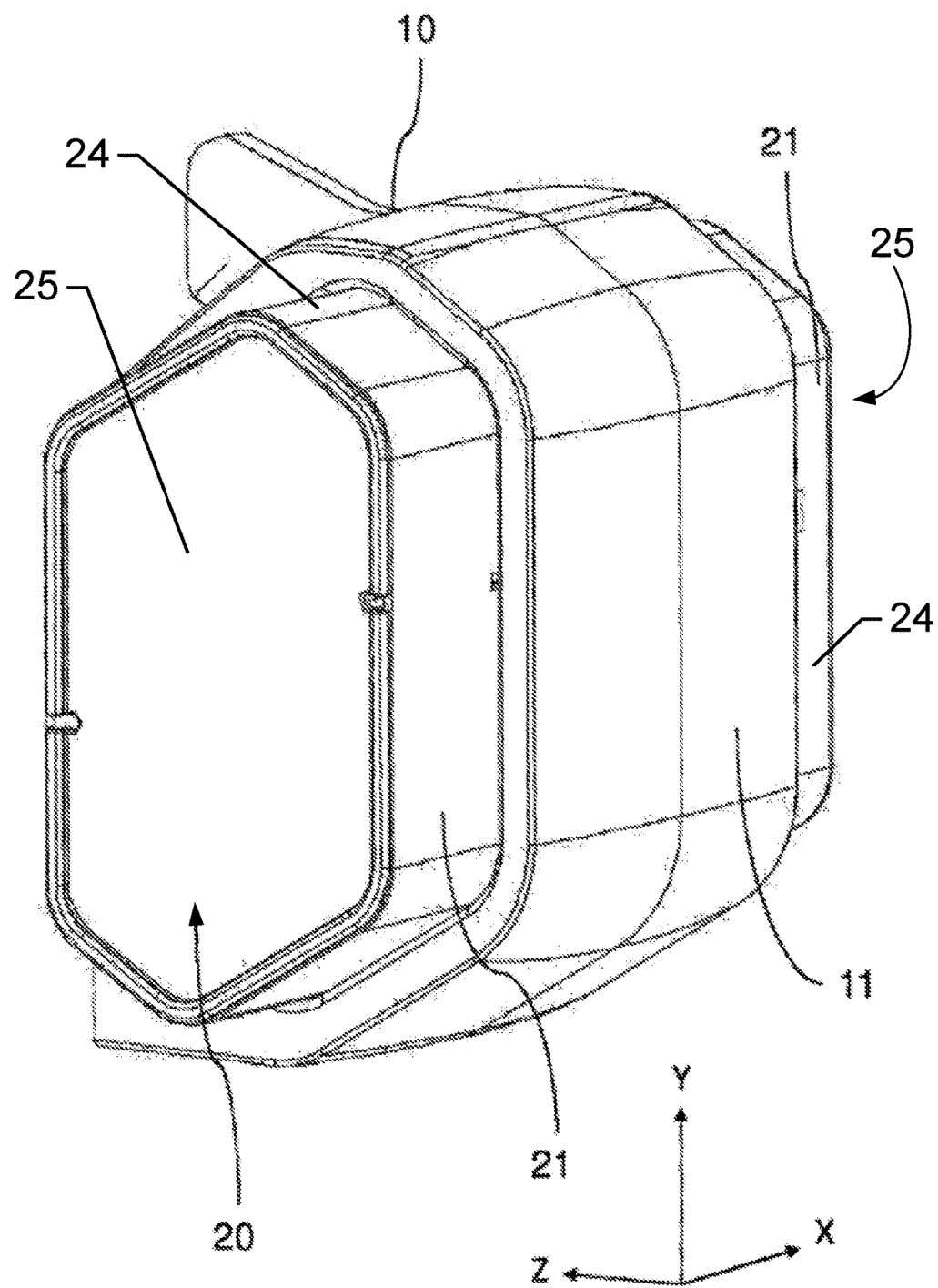
FIG. 3 shows a perspective view of a rear part of a battery powered tool with a mounted battery pack according to an embodiment of the invention.

FIG. 3 describes a battery pack 20 of a larger size, with larger power capacity than a normal sized battery pack, mounted in the through aperture 12 in the tool body 10. Two extending parts 21 of sidewalls 24 of the battery pack 20 extends outside the tool body 10 on each side of the through aperture 12 along the direction X. The sidewalls 24 define a perimeter of the opposing ends 25 of the battery pack 20. Preferably the two extending parts 21 have substantially equal length such that the battery pack 20 extends outside the tool body 20 with a substantially equal amount on each side of the tool body 10. Thereby, the weight distribution around the axis Z will still be in balance even when a larger battery pack 20 is mounted in the through aperture 12. If needed for any reason, a battery pack extending outside the through aperture 12 could extend further on one side of the tool body then on the other side. The same battery pack 20 could be used for several different power tools having different power consumption. The different power tools may thereby all be designed and arranged for receiving the same battery packs of different sizes such that the balance is kept for all the different power tools with different battery packs.

Figure 4:
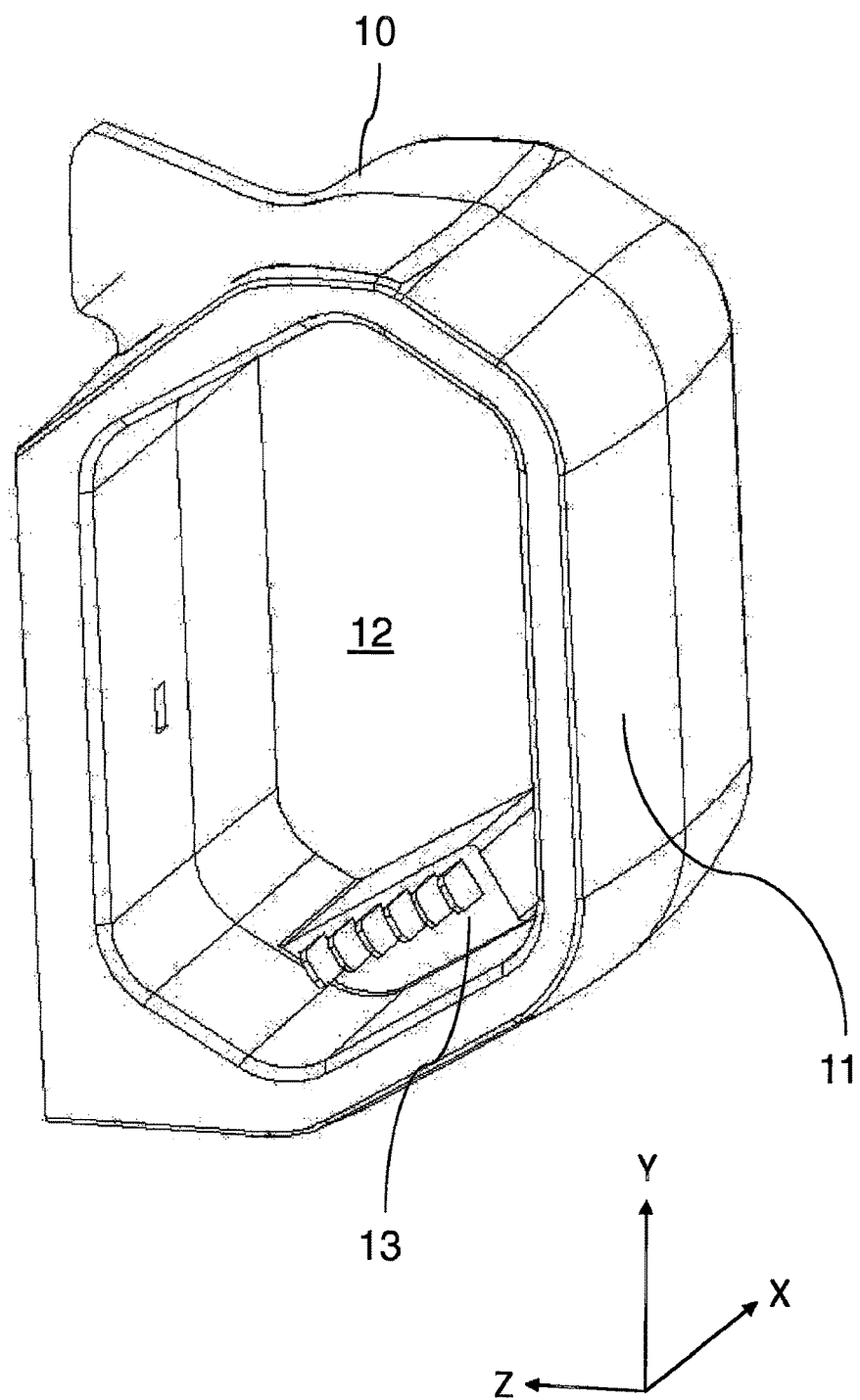
FIG. 4 shows a perspective view of a rear part of a battery powered tool according to an embodiment of the invention.

FIG. 4 describes the tool body 10 with an empty through aperture 12. The through aperture 12 comprises a female connector 13. The female connector 13 is used for power transfer from the battery pack 20, via the connector 13, to the electric motor 3.

Figure 5:
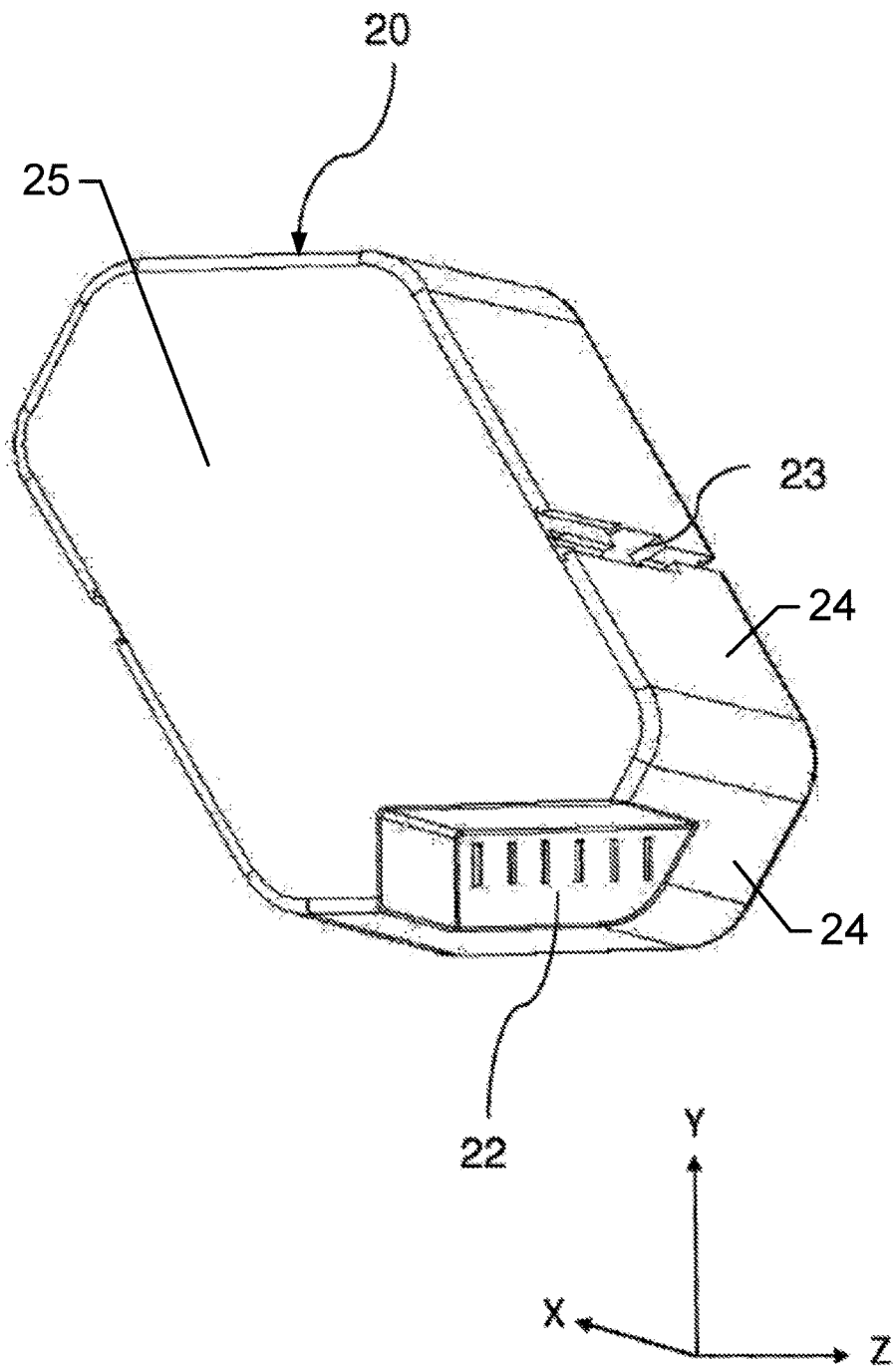
FIG. 5 shows a perspective view of a battery pack according to an embodiment of the invention.

FIG. 5 describes a battery pack 20 with a corresponding male connector 22 adapted to integrate with the female connector 13 in the through aperture 12 for power transfer to the motor 3 in the tool 1. The female connector 13 in the through aperture 12 is provided with a number of tongues adapted to integrate with an equal number of apertures in the battery pack male connector 22. The tongues are of metal adapted to conduct electricity from the battery pack 20 to the tool. The female and male connectors 13, 22 may be placed on the contrary, such that the male connector with tongues is placed on the battery pack 20, and the female connector is placed in the through aperture 12. Sidewalls 24 and opposing ends 25 of the battery pack 20 are also shown in FIG. 5.

Due to the connectors 13, 22, the battery pack 20 needs to be inserted in the through aperture 12 from a certain direction. The position of the connectors 13, 22 also decides how the battery pack 20 extends when mounted in the through aperture 12. The connector 13 in the through aperture 12 is preferably placed in the middle, or close to the middle, of the length along the direction X of the through aperture 12. Correspondingly, the connector 22 on the battery pack 20 is preferably placed in the middle, or close to the middle, of the length along the direction X of the battery pack 20. Thereby, the battery pack 20 will extend outside the tool body 10 in equal amounts in the two directions along the direction X.

The battery pack 20 further comprises a locking device 23. The locking device 23 is adapted to lock the battery pack 20 to the tool body 10 when the battery pack 20 is mounted in the through aperture 12. The locking device 23 needs to securely hold the battery pack 20 in the through aperture 12 during use of the tool 1. Further, the locking device 23 needs to be easy to unlock in order to enable easy unmounting of the battery pack 20 from the tool body 10.

The invention claimed is:

1. A battery powered tool extending in a longitudinal direction, comprising:
   a tool body;
   a battery pack, wherein the battery pack is configured to be installed into the tool body to power the battery powered tool;
   an electric motor configured to be powered by the battery pack and drive an operating part of the battery powered tool during operation; and
   wherein the tool body is provided with a through aperture defined by a continuous enclosure extending through the tool body in an elongation direction perpendicular to the longitudinal direction of extension of the battery powered tool, wherein the longitudinal direction of extension of the battery powered tool is defined by the operating part, and wherein the tool body is configured to receive the battery pack into the through aperture by insertion of the battery pack in the elongation direction of the through aperture such that the tool body surrounds a perimeter of the battery pack when the battery pack is received in the through aperture, wherein the battery pack comprises sidewalls extending in the elongation direction between opposing ends of the battery pack, wherein the perimeter is defined around the sidewalls between the opposing ends, and wherein the opposing ends of the battery pack are visible when the battery pack is received in the through aperture of the tool body;
   wherein the battery powered tool further comprises:
      a first handle affixed to the tool body at a rear of the tool body opposite the operating part and along the longitudinal direction, and
      a second handle affixed to the tool body, the second handle being positioned forward of the through aperture and rearward of the operating part along the longitudinal direction.

2. The battery powered tool according to claim 1, wherein a length of the battery pack is substantially the same as a length of the through aperture.

3. The battery powered tool according to claim 1, wherein at least one end of the battery pack protrudes outside the tool body when mounted in the through aperture.

4. The battery powered tool according to claim 1, wherein each of the opposing ends of the battery pack protrude outside the tool body in two directions along the elongation direction of the through aperture when the battery pack is mounted in the through aperture.

5. The battery powered tool according to claim 4, wherein the each of the opposing ends of the battery pack are adapted to protrude in substantially equal amounts in the two directions.

6. The battery powered tool according to claim 1, wherein the tool body is provided with a connector within the through aperture, which connector is adapted to integrate with a corresponding connector on the battery pack when the battery pack is mounted in the through aperture.

7. The battery powered tool according to claim 1, wherein the battery pack is visible from the outside when mounted in the through aperture.

8. The battery powered tool according to claim 1, wherein the battery powered tool is provided with an indicator adapted to indicate whether or not the battery pack is correctly fitted in the through aperture.

9. The battery powered tool according to claim 1, wherein the battery pack comprises a locking device adapted to lock the battery pack to the tool body.

10. The battery powered tool according to claim 1, wherein the tool is a handheld garden tool.

11. The battery powered tool according to claim 1, wherein the tool is a handheld forestry tool.

12. The battery powered tool according to claim 1, wherein the portion of the battery pack surrounded by the tool body is not visible.

13. The battery powered tool according to claim 12, wherein no part of the battery pack extends outside of the tool body.

14. The battery powered tool according to claim 12, wherein at least one of the opposing ends extends outside of the tool body.

15. The battery powered tool according to claim 12, wherein the opposing ends extend outside the tool body by an equal distance.

16. The battery powered tool according to claim 1, wherein the operating part comprises a vegetation trimmer or a chain saw.

17. The battery powered tool according to claim 1, wherein the second handle is oriented parallel to the elongation direction.

18. A battery powered tool comprising:
   a tool body;
   an operating part affixed to and extending from the tool body in a longitudinal direction;
   a first handle affixed to the tool body at a rear of the tool body opposite the operating part;
   a through aperture passing through the tool body and externally open and visible at ends of the through aperture, the through aperture being positioned forward of the first handle along the longitudinal direction, the through aperture extending through the tool body in an elongation direction that is directed through the externally open visible ends of the through aperture;
   a second handle affixed to the tool body, the second handle being positioned forward of the through aperture and rearward of the operating part along the longitudinal direction; and
   a battery pack configured to be received in the through aperture such that opposing ends of the battery pack are externally visible through the ends of the through aperture; and an electric motor configured to be powered by the battery pack and drive the operating part during operation of the battery powered tool;

wherein the through aperture is configured to receive the battery pack into the through aperture by insertion of the battery pack in the elongation direction of the through aperture.

19. The battery powered tool of claim 18, wherein the operating part comprises a vegetation trimmer or a chain saw.

20. The battery powered tool of claim 18, wherein a weight of the battery pack is balanced with respect to the longitudinal direction.

* * * * *